(No Model.)  4 Sheets—Sheet 1.

E. E. RIES.
SYSTEM OF ELECTRIC GENERATION AND DISTRIBUTION FOR RAILWAY CARS.

No. 411,301. Patented Sept. 17, 1889.

Fig. 1.

Attest:
Joseph Becker
Carr B. Waller

Inventor:
Elias E. Ries,
By F. R. Harding
his Attorney.

(No Model.)  4 Sheets—Sheet 2.

E. E. RIES.
SYSTEM OF ELECTRIC GENERATION AND DISTRIBUTION FOR RAILWAY CARS.

No. 411,301. Patented Sept. 17, 1889.

Fig. 2.

ATTEST:
INVENTOR:
Elias E. Ries,
By F. R. Harding
his Attorney (No Model.) 4 Sheets—Sheet 3.

E. E. RIES.
SYSTEM OF ELECTRIC GENERATION AND DISTRIBUTION FOR RAILWAY CARS.

No. 411,301. Patented Sept. 17, 1889.

(No Model.) 4 Sheets—Sheet 4.

E. E. RIES.
SYSTEM OF ELECTRIC GENERATION AND DISTRIBUTION FOR RAILWAY CARS.

No. 411,301. Patented Sept. 17, 1889.

Attest:
Joseph Becker
Carr B. Waller

Inventor:
Elias E. Ries,
By F. R. Harding,
his Attorney.

UNITED STATES PATENT OFFICE.

ELIAS E. RIES, OF BALTIMORE, MARYLAND, ASSIGNOR TO RIES & HENDERSON, OF SAME PLACE.

SYSTEM OF ELECTRIC GENERATION AND DISTRIBUTION FOR RAILWAY-CARS.

SPECIFICATION forming part of Letters Patent No. 411,301, dated September 17, 1889.

Application filed April 11, 1888. Serial No. 270,247. (No model.)

*To all whom it may concern:*

Be it known that I, ELIAS E. RIES, a citizen of the United States, residing at Baltimore, in the State of Maryland, have invented certain new and useful Improvements in Systems of Electric Generation and Distribution for Railway-Cars; and I do hereby declare the following to be a full, clear, and exact description of the invention, such as will enable others skilled in the art to which it appertains to make and use the same.

My invention relates to a new and improved system of generation and distribution of electrical energy for a railway vehicle or train, whereby the momentum of said vehicle or train is utilized to impart rotary motion to the armature-shaft of a dynamo-electric generator mounted upon the truck of the car and having for its armature-shaft the axle of the said truck. By this arrangement current is generated in an economical and efficient manner and stored in secondary batteries or accumulators to be used in heating and lighting the train, or for any other desirable purpose, such as signaling, braking, &c. When the axle of railway-cars forms the armature-shaft of a dynamo-machine, as in this case, the said armature must necessarily vary in speed in accordance with the variation in the speed of the car. Consequently as the ordinary speed of a railway-train varies from one (1) to sixty (60) miles per hour, according to the grades, stoppages, &c., it will be apparent that at certain times—say, for example, when the train is running within the limit of from one (1) to fifteen (15) miles per hour—the velocity of the armature of the dynamo will not be sufficiently great to produce any appreciable result in the generation of current, at least not sufficient to operate electric lights, heat-radiators, brakes, &c. Therefore, it will be obvious that before any available amount of current can be generated and stored in the accumulators the train must attain a momentum of, say, fifteen (15) miles per hour, at which time the circuit connecting the dynamo with the storage-battery must be closed and the battery should begin to receive its charge. On the other hand, it will be conceded that when the train attains its maximum speed of, say, sixty (60) miles per hour the velocity of the armature, and consequently the supply of current, is so great that the brushes of the dynamo will be burned out, the filaments of the lamps destroyed, and the battery-plates overcharged and spoiled. Consequently, in order to carry out successfully and practically the object of this present invention, it will be necessary to make the following provisions, so that the battery will be charged in a uniformly-constant manner and the translating devices may receive their complement of current from the battery: first, to provide means so that the dynamo will not be capable of charging the secondary battery until the velocity of the armature attains the speed necessary to generate current of the required electro-motive force to charge said battery, and, second, to regulate the electro-motive force of the current generated by the dynamo, so that it will be uniformly constant in electro-motive force irrespective of the varying speed of the armature.

For the attainment of these objects my invention consists, essentially, in providing the truck of a railway-coach with a dynamo of any approved type, having for its armature shaft or shafts one or more axles of said truck. From the dynamo the feeding or supply circuit extends (preferably in series) to a storage-battery, and is controlled by a potential switch, which is arranged to open or close the circuit to the battery, according to the state of the charge in the latter. The supply-circuit from the battery extends throughout the train and includes incandescent lights and heat-radiators and other translating devices. The continuity of the said supply-circuit is preserved between the several cars or coaches of the train by an automatic electric coupling. The field-magnet coils of the dynamo are independently arranged, so that they may be gradually cut in or out by the action of a solenoid-switch, which is controlled by a shunt from the storage-battery. The field-magnet circuit is controlled by two instrumentalities, viz: first, by a gravity-switch, which is arranged to be operated by the undulations or grades of the road-bed, and is designed to only close the field-magnet circuit when the train is on a level or is descending a grade—that is to say, it is designed to close said circuit only when the speed of the train insures the speed of the armature to be sufficient to generate a charging-current—and, second, by a speed-governor so arranged as to close the field-magnet circuit when certain limits of speed are reached—say, for example, when the train is running at from fifteen (15) to fifty (50) miles per hour—and to open said circuit when the speed of said train is less than fifteen (15) or more than fifty (50) miles per hour.

My invention consists, further, in a certain organization of apparatus, arrangement of circuits and connections, and combinations of parts, all of which will be fully explained and specifically claimed hereinafter.

In the accompanying drawings I have shown certain appliances which are believed to be sufficient for adequately carrying out my invention. However, I do not limit myself to the specific forms and constructions illustrated, inasmuch as numerous departures may be made without in the least deviating from the spirit of my invention.

Referring to the drawings.

Like numbers of reference mark similar or corresponding parts in the several views of the drawings.

Figure 1:
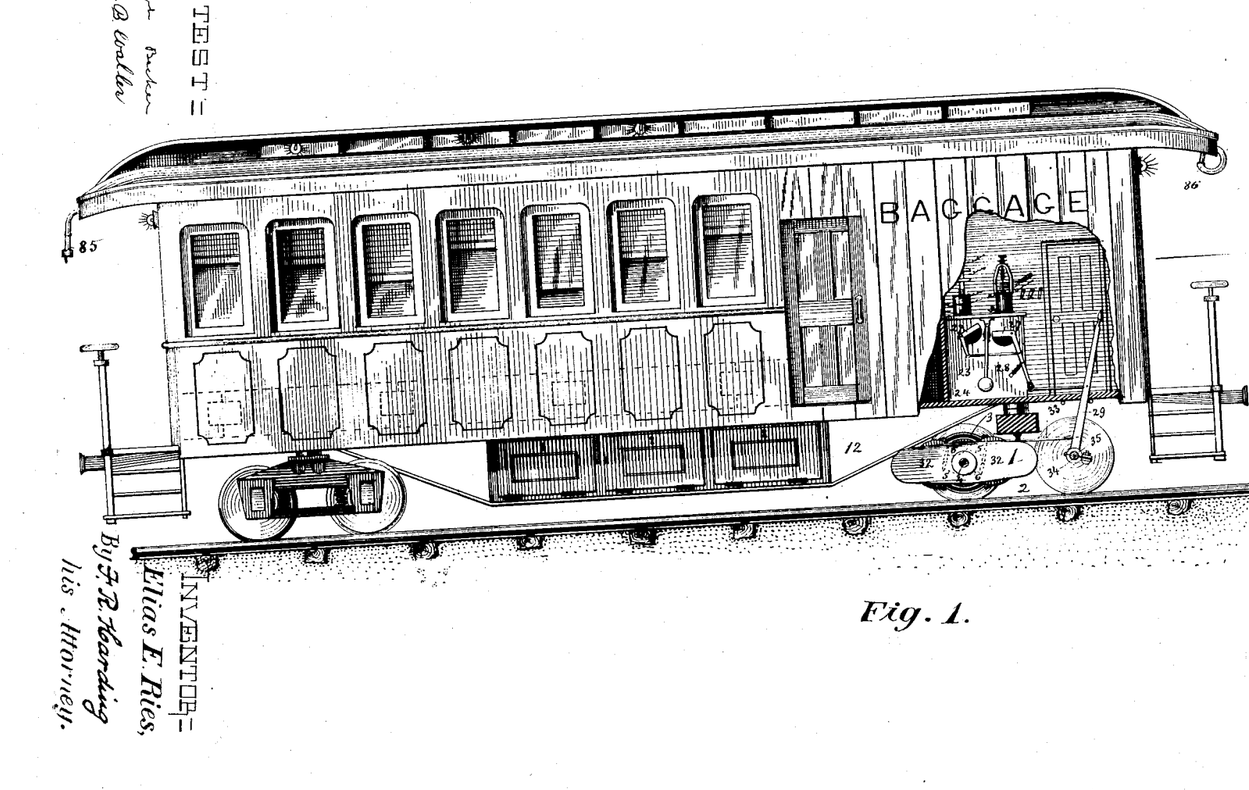
Figure 1 is a longitudinal side elevation partly in section and with parts broken away, showing a railway-coach equipped with my invention and having a baggage-compartment at one end containing the gravity, solenoid, and potential switches.

Referring to the drawings by numbers, 1 indicates a continuous-current dynamo-electric generator mounted upon the frame-work of the truck 2 and having its armature 3 mounted upon the axle 4, as shown clearly in Fig. 1.

Figure 3:
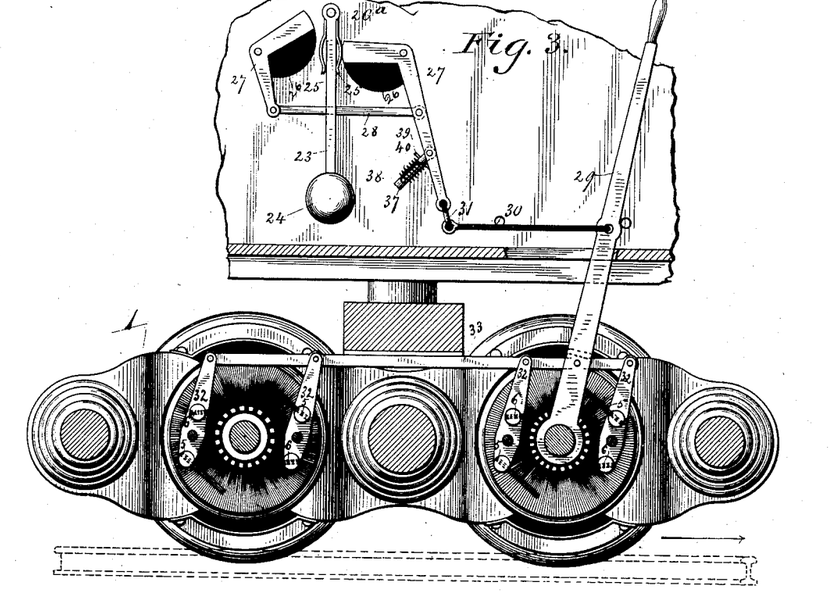
Fig. 3 is a side elevation of one-half of the truck of the coach shown in Fig. 1, with two car-wheels and the side frame of the dynamo removed to show a modification of dynamo shown in Figs. 1 and 2 and an arrangement for shifting the commutator-brushes. In connection with this view are shown the gravity-switch and its contacts, on an enlarged scale, the same being located, as shown in Fig. 1, in the baggage-car.
Figures 4, 5:
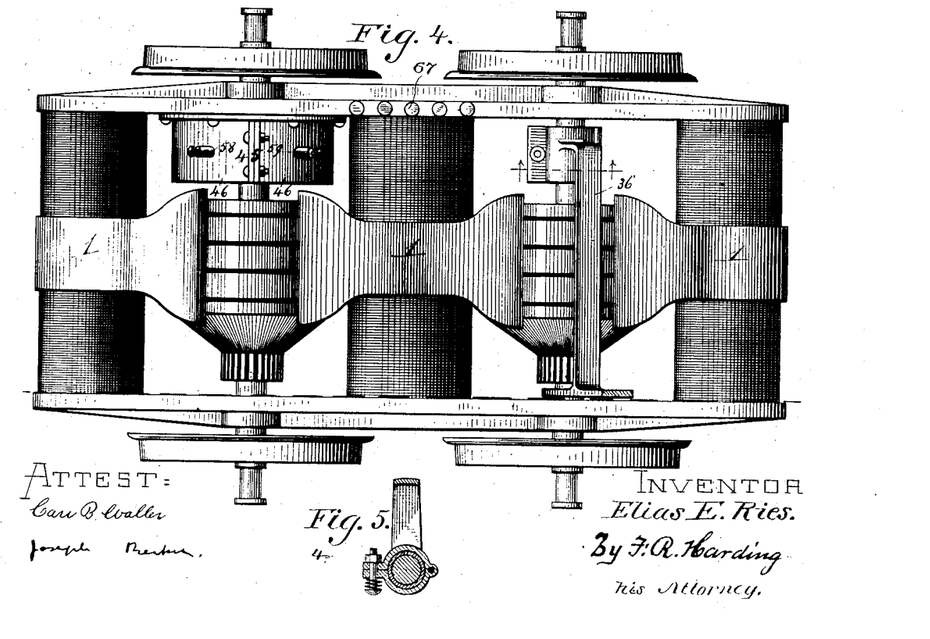
Fig. 4 is a plan view of Fig. 3, the coach being removed to illustrate the construction of the dynamo and the location of the speed-governor for the field-magnet circuit.
Fig. 5 is a detail view showing the friction-bearing of the commutator-shifting lever when the latter is pivoted to the axle in the manner shown in Fig. 4.
Figures 6, 7, 8:
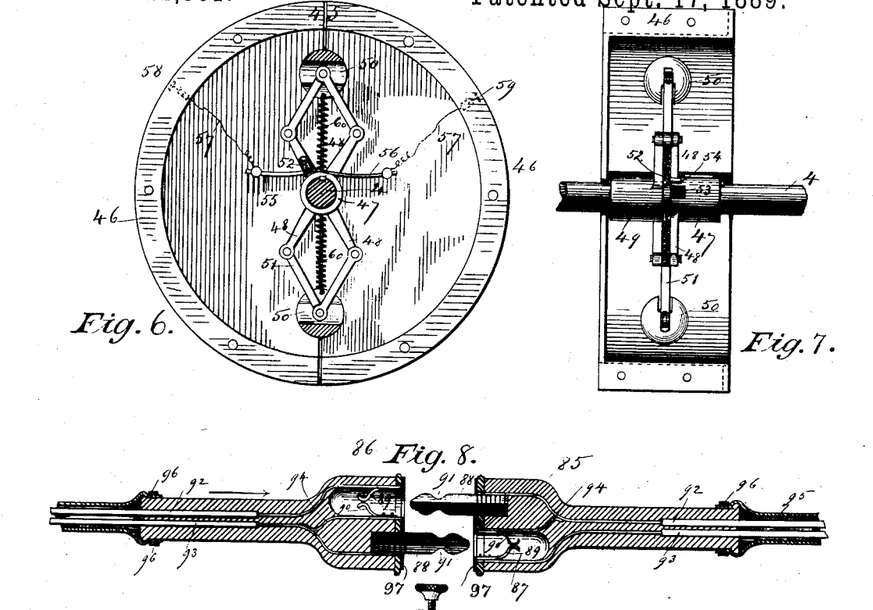
Figs. 6 and 7 are detail enlarged views of the speed-governor shown in Figs. 2 and 4.
Fig. 8 is a longitudinal sectional view of an automatic coupling for preserving the continuity of the circuit between the several cars or coaches of a railway-train.

Instead of a single set of brushes, as is usual, the dynamo 1 is provided with a double set of commutator-brushes 5 6, as is shown clearly, the object of such construction being to allow the armature to revolve in either direction, as would be necessary in this instance where the train is apt to travel forward or backward. Thus by providing means for shifting the two sets of commutators 5 6 the dynamo 1 can be employed to generate current no matter in what direction the train is traveling; but in order to effect this result it will be necessary in practice to arrange the shifting mechanism for said double set of brushes to automatically control both sets of commutators according to the direction in which the car or train is moving, or, in other words, to arrange said shifting mechanism to automatically shift one set of brushes upon the commutator as the train proceeds forward, and as the train reverses its direction of travel to reverse the position of the brushes, automatically bringing the other set of brushes into position. This shifting mechanism is shown in Figs. 1, 3, and 4, and will be fully described hereinafter.

Referring to Fig. 1, it will be seen that the dynamo 1 is provided with a single armature mounted upon an axle of the car-truck. However, in practice it may be found desirable to provide a double or compound armature machine. Accordingly I have shown in Figs. 3 and 4 a dynamo 1, having two armatures mounted, respectively, upon two adjacent axles of the car-truck. In this case I have provided three separate field-magnets, one at each end and one in the center, the latter serving in a dual capacity as a field-magnet for both armatures. In this construction the field-magnets are in series with each other, thereby constituting a field of great magnetic strength.

As before stated, the armature-shaft of the dynamo 1 cannot attain the speed requisite for the generation of current of the required strength for charging the secondary battery herein described until the train reaches a certain momentum. Consequently it will be understood that if the storage-battery were already charged, and the train had not yet imparted sufficient velocity to the armature of the dynamo to cause a generation of current having an electro-motive force equal to or greater than the counter electro-motive force of the battery, the counter electro-motive force of the battery would cause the battery-current to be discharged back into the dynamo through the circuit connecting the two. Therefore it is necessary to provide means for preventing any flow of current from the dynamo to the storage-battery, or vice versa, until the dynamo has developed the speed required to furnish a current of sufficient strength to charge the battery.

Figure 2:
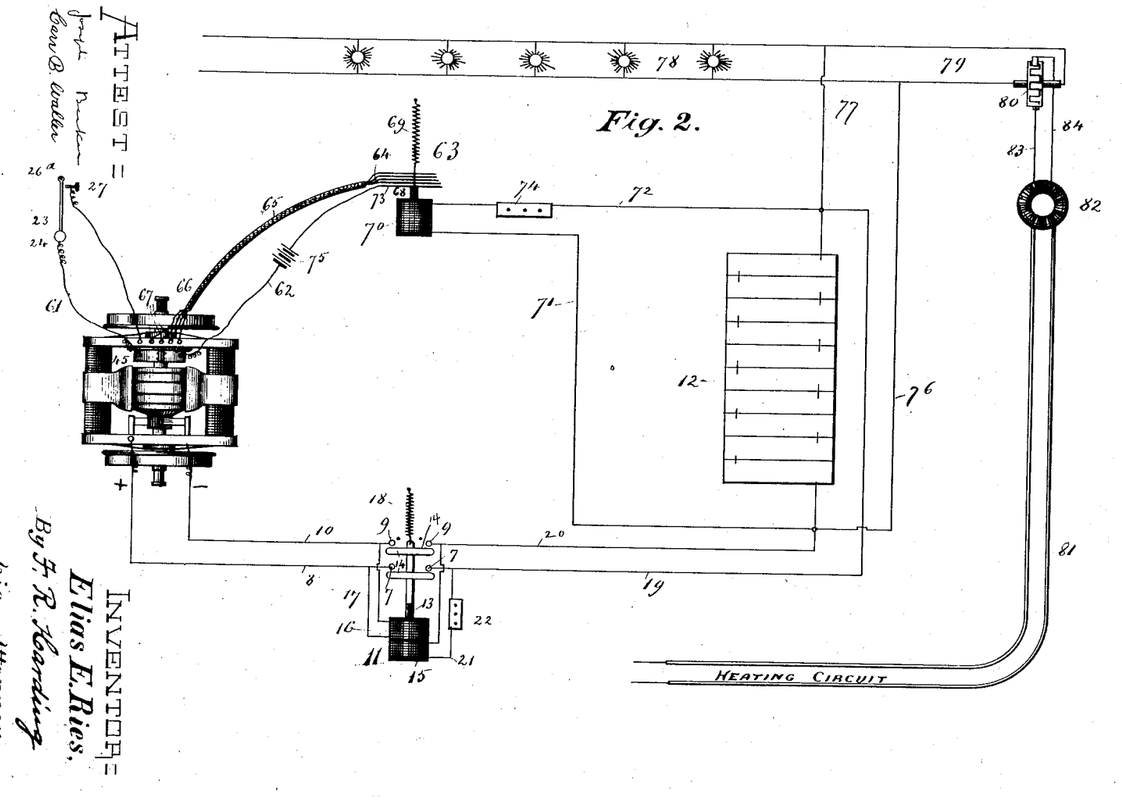
Fig. 2 is a diagrammatical view of my complete invention.

In Fig. 2 of the drawings is illustrated a potential switch, which serves to connect and disconnect the charging-circuit of the dynamo with the storage-battery at the proper time, as will be understood from the explanation now following.

Referring to Fig. 2, the plus commutator-brush of the dynamo is connected with the terminal 7 by the conductor 8, and the minus brush is in circuit with the terminal 9 by the conductor 10.

11 designates a double solenoid, which serves in the capacity of a "potential switch" and is placed intermediately of the circuit leading from the dynamo 1 to the storage-battery 12. The said double-solenoid switch 11 consists of a core 13, having the bridge-contacts 14 14 so placed and constructed as to simultaneously and respectively make or break contact with both sets of switch-terminals 7 7 and 9 9. When the core 13 is attracted by the lower coil 15 of the solenoid, which is energized by the secondary battery, the bridges 14 14, crossing, respectively, between the terminals 7 and 9, are out of contact with the said terminals. Consequently the first portion of the current generated by the dynamo, instead of flowing back and forth over the bridges 14 14 through the charging-circuit into the battery, is diverted from the conductors 8 and 10 into the upper coil 16 of the solenoid 11 by the shunt 17, connected in parallel in the charging-circuit. However, as soon as the potential of the current generated by the dynamo becomes equal to or exceeds that of the storage-battery 12 it neutralizes the attractive force of the lower coil 15, thus allowing the retractile spring 18 to vertically lift the core 13 until the bridges 14 14 are coincident with their respective terminals 7 and 9, thereby establishing a closed circuit from the dynamo 1 to the battery 12 by the conductor 8, terminals 7 7, bridge 14, conductor 19, and back by the conductor 20, terminals 9 9, other bridge 14, and conductor 10 to the dynamo. It would be well to here state that if the battery 12 contained no charge when the dynamo developed a charging-current there would be no current flowing from the battery through the lower coil 15, and therefore the circuit from the dynamo would be closed by virtue of the spring 18 maintaining the contact of the bridges 14 14 with terminals 7 and 9, since the resistance of the upper coil 16 is greater than that of the circuit leading to the battery. Contemporaneously with the process of charging the secondary battery, as just described, a portion of the charging and battery currents will flow through the two coils of the solenoid 11, thus neutralizing their individual attraction for the core 13, so that the tension of the spring 18 is freely exerted upon the said core, thereby preserving the continuity of the charging-circuit through the terminals 7 and 9 and the bridge-pieces 14 14.

In the shunt 21, connected in parallel with the conductors 19 and 20 and including the lower coil 15 of the solenoid 11, is inserted the rheostat 22, for the purpose of making the said shunt or branch of slightly greater resistance than the branch 17, which includes the upper coil 16 of the solenoid. Therefore, as the process of charging the battery continues and the counter electro-motive force or resistance of the battery to the charging current increases an additional amount of current is diverted by the branches 21 and 17 through the helices 15 and 16, of which the greater portion is directed through the upper coil 16, owing to the lower resistance of the former. However, such relative difference of resistance is so arranged that at such times when the battery has become fully charged, or has received sufficient charge for the purposes desired, the resistance of said battery to the incoming or charging current will have become so great that the charging-current will cause the upper coil to exert a greater attractive power upon the core, thus breaking the charging-circuit. By means of this potential balance, constructed and arranged to operate as just described, not only the time for admitting the charging-current to the battery is accurately determined, but also the proper moment for cutting out the battery to prevent overcharging and the time for the same to again receive the charging-current when it has become somewhat depleted is determined. It will be understood that the two coils 15 and 16 of the solenoid 11 are of equal resistance in themselves, and are only rendered differential by the introduction of the rheostat 22 in the branch 21, leading to the lower coil 15.

From the preceding description and explanation it will be readily comprehended that as soon as the dynamo has developed sufficient momentum to generate a charging-current for the battery the potential switch will establish a closed circuit to said battery, so that the same may receive its charge, provided that it is not at that time charged with a current greater in counter electro-motive force than the direct electro-motive force of the dynamo. However, if the latter is the case the charging-circuit will remain open until the dynamo develops an electro-motive force greater than the counter electro-motive force of the battery, at which time the charging-circuit will be completed and the battery will receive an additional charge.

It has been before stated that before the dynamo can develop current of sufficient strength to charge the secondary battery the speed of the train must have reached a certain number of miles per hour, which number I have assumed to be fifteen (15) miles per hour. Taking such as granted, it will be clear that an ordinary railway-train would not attain a speed of fifteen miles per hour except on substantially-level portions of the line and on downgrades, since it is well known that the skidding of the driving-wheels and the additional weight due to gravity preclude the possibility of said train attaining any great speed on upgrades. Therefore, in order that the dynamo may not be forced to generate current until the train is on substantially a level portion of the line of way, or is on a downgrade, I have provided a device whereby the field-magnet circuit of the dynamo 1 is not completed until the train is traveling on a level or downgrade, which device consists of a circuit-controlling switch designed to be operated by the undulations or grades of the roadway, so that as long as the train is upon a level or upon a downgrade the field-magnet circuit of the dynamo will be closed, but when the train reaches an upgrade said circuit will be broken. This switch is shown in Figs. 1, 2, and 3 of the drawings and comprises a pendulum-lever 23, pivoted vertically to any fixed part and at any suitable locality in the train, as shown more particularly in Figs. 1 and 3, and is capable of an oscillating motion in the direction of the length of the car. Upon the lower free extremity of this lever is attached a dependent weight 24, for the purpose of maintaining the lever 23 normally in a perpendicular line irrespective of the inclination of the car. Near the upper pivoted extremity of said lever 23 and on each side thereof is secured a contact-spring 25, which is electrically in circuit with the pivot-pin 26$^a$, which in turn is electrically in contact with one side of the field-magnet circuit. (See Fig. 2.) On each side of this pendulum is pivoted a bell-crank lever 27, made of conducting metal and carrying a piece of insulation 26, having its side or edge facing its contact-spring 25 curved or rounded to conform with the arc of the circle which the extremity of the horizontal arm of said bell-crank lever describes in its normal movement about its pivot-point. Thus, as the pendulum swings to and from the contact-springs 25 25 it will either engage the conducting extremity of each lever 27 or the insulation 26, as the case may be. The two levers 27 27 are loosely connected by the link 28, so that they will be oscillated in unison by means of the vertical shifting lever 29, which is connected with one of the levers 27 by the link 30 and swivel-joint 31. The lever 29, just referred to, is arranged to control both the movement of the bell-crank levers 27 27 and the double set of commutator-brushes 5 6, as will be seen from the following explanation: It is understood that the object of a double set of commutator-brushes is to permit the use of the dynamo no matter in what direction the train is traveling, and it has also been stated that it is proposed herein to automatically govern the shifting of the brushes 5 and 6 by the direction of travel of the train by employing an automatic shifting mechanism. Bearing this in mind it will, moreover, be quite apparent that inasmuch as the dynamo is to be used for both directions of travel, and that the gravity-switch is to control the field-magnet circuit of said dynamo, the said switch will have to be operated automatically by the same mechanism as is employed to shift the commutator-brushes 5 6, since said switch is to close the field-magnet circuit only on level portions of the line and on downgrades. This supposition is rendered most conclusive when it is remembered that what would be an upgrade in one direction of travel would be a downgrade on a return, and therefore the operation of the gravity-switch would be reversed on such return.

Having thus established the relation between the gravity-switch as controlling the field-magnet circuit and the shifting mechanism of the commutator-brushes 5 and 6, I will first proceed to describe the construction and operation of said brush-shifting mechanism, and will then describe the action of the gravity-switch in connection therewith.

Referring to Fig. 1, two commutator-brushes 5 6 are rigidly attached to a pivoted link-rod 32, which is, by virtue of its vibratory movement, capable of alternately bringing the brushes 5 and 6 into engagement with the commutator of the dynamo 1 and is loosely jointed to the longitudinal connecting-bar 33 at its upper extremity. Each link-rod 32 carries a brush 5 6 of each set of commutator-brushes 5 5 and 6 6, so that when a brush of one set of commutators is thrown into position by a movement of said link-rod the other brush of the remaining set will be moved out of contact with its commutator. The connecting-bar is loosely hinged to the shifting lever 29, so that a proper movement of the latter will operate the former and its attached link-rods 32, thereby simultaneously throwing one set of brushes in position and the other set out of engagement with the commutator. The shifting lever 29 is pivotally secured to the axle 34 by a friction-bearing, which consists of a journal 35, having an inner lining of soft metal to prevent wear on the axle, and is frictionally clamped against the axle in any approved manner—such, for instance, as by a clamp-nut passing through two laterally-extending lips formed integral with the journal and slightly separated by rubber or other elastic material—whereby the friction may be variably maintained.

In Figs. 3 and 4 is shown in detail the arrangement of the lever 29 when applied to a dynamo having a double armature. In this instance, instead of being journaled to the axle 34, as in Fig. 1, it is loosely attached on the armature-shaft in front of the commutator by a journal, and a lateral extension 36 projects horizontally over one armature and terminates in the friction-bearing previously described. It will also be noticed that the double-armature construction shown in Fig. 3, previously described, requires four instead of two sets of commutator-brushes. Consequently the connecting-bar 33 of the shifting mechanism is made somewhat longer, and is provided with two additional link-rods 32 32 to meet this construction. (See Fig. 3.) As the train proceeds in the direction of the arrow in Fig. 1, the axle 34, carrying the shifting lever 29, is revolving in the same direction, and the friction exerted by the latter upon the loose journal-bearing 35 compels the said lever 29 to continue to move to the right of a perpendicular line until the brushes 6 6 come into contact with their commutators, and said lever is maintained in such position as long as the train proceeds in that direction. At the same time the lever 29 is thus moved it throws the extremity of the horizontal arm of the right-hand bell-crank lever 27 in line with its adjacent contact-spring 25 and at the same time shifts the other lever 27, so that its insulation 26 is presented in line with the opposite contact-spring 25, thereby offering only one electrical contact with which the pendulum 23 can engage. Now, it being remembered that the switch-lever 23 is designed to close the circuit only when the train is on a level or is on a downgrade, and also bearing in mind that the train is traveling in the direction of the arrow, it will be seen that the weight 24 will be normally in contact with the right-hand lever 27 on a level and will be shifted even more to the right should the train enter upon a declivity. Therefore as long as the train moves in the direction of the arrow on a level or on a downgrade so long will the circuit be closed; but if an upgrade is encountered while thus traveling the pendulum-lever will move to the left, but will not close the circuit, since it will encounter the insulation 26 on its left-hand side. Now should the train reverse its direction of travel the reversed revolution of the axle 34 will throw the lever 29 to the left of the perpendicular line, thereby bringing the other set of brushes 5 5 into position against the commutator and reversing the position of the bell-crank levers 27, so that the left-hand one is presented for contact with the pendulum 23.

It is not believed that a further explanation of the reverse operation of these devices will be necessary, since the previous description will enable any one to comprehend the same.

As shown in Figs. 1 and 3, one of the levers 27 is provided with a longitudinally-slotted plate 37, connected at one end to said lever 27 and capable of a slight play over the rigid pin 38. Between the pin 38 and a cross-piece 39 is a coiled spiral spring 40, arranged to exert its tension against the pin 38, in order to keep the lever 27 normally in its proper place and to deaden any vibration or jar caused by the car or lever 29, which latter is connected with said lever 27 by the loose joint 30, to prevent vibration from displacing the relation of the pendulum and its presented contact.

In addition to providing the gravity-switch for controlling the field-magnet circuit according to the grades along the line of way, I have deemed it necessary to take the precaution of controlling said field-magnet circuit by a speed-governor so arranged as to automatically make and break said circuit according to the momentum of said train, for the reason that the car carrying the dynamo might attain such velocity as to cause the generator to develop current of sufficient strength to do damage to the battery-plates, commutator-brushes, switches, &c., by a sudden charge. This speed-governor is shown in Figs. 1, 2, 4, 7, and 8 of the drawings, and more particularly in Figs. 7 and 8, to which attention is now directed.

45 designates a separable air-tight casing made circular in form and composed of two portions 46 46, which are designed to be fitted together in any suitable manner in the position shown in Fig. 4 and to receive the interior parts comprising the speed-governor before referred to.

47 designates a tubular metallic sleeve keyed rigidly on the commutator-shaft 4, and having two metallic radial arms 48 48, projecting outwardly at diametrically-opposite points and formed integrally therewith, and 49 is another metallic tubular sleeve similar in arrangement and construction to the sleeve 47, except that instead of being rigidly mounted upon the shaft 4 it is loosely journaled thereon. The outward free extremity of each arm 48 is flexibly connected with a weight 50 by a link-rod 51. Thus as the axle 4 revolves in either direction the weights 50 are expanded or contracted by centrifugal force, thereby moving the loose sleeve 49 about its axis 4.

To one of the arms 48 of the sleeve 49 is fixed a laterally-projecting contact-spring 52, so arranged and constructed as to normally bear upon the exterior circular surface of the adjacent rigid sleeve 47, which has its surface with which said spring engages provided with two pieces of insulation 53 53, inserted into the body of the sleeve flush with the surface and separated from each other a certain distance by a conducting portion 54.

55 designates a brush bearing upon the sleeve 49, and 56 is another brush bearing upon the sleeve 47, and both brushes are respectively connected with the binding-posts 58 59 of the field-magnet circuit by wires 57 57. (See Figs. 4 and 7.)

60 60 are two spiral springs, of equal tension, and each having one extremity attached to a weight 50 and its other end secured to the axle 4.

The operation of this speed-governor is as follows: The distance between the two pieces of insulation 53 53, or, in other words, the width of the conducting portion 54, represents prescribed limits within which the speed of the axle (train) insures the generation of current of the required strength to charge the battery, while the insulation 53 on one side represents a point at which the rate of speed will be less than the minimum speed required for such generation, and the insulation on the other side is for the point at which the rate of speed is beyond the maximum of the speed required for the generation of current. This being understood, the operation of the device will be easily followed. The tension of the springs 60 60 is so adjusted as to keep the weights 50 50 sufficiently close to the shaft 4 to permit the contact-spring 52 to be on the insulation which represents the point below the minimum speed required. Now as the axle 4 attains increased velocity the centrifugal force tends to expand the weights away from the center and to overcome the tension of the springs 60 60, and as the weights recede from the center the loose sleeve 49 is rotated proportionally upon the axle, thereby gradually causing the contact-spring 52 to advance upon the conducting portion 54, thus closing the field-magnet circuit. Should the speed of the axle increase beyond the maximum, then the contact-spring 52 would continue to advance over the conducting portion 54 upon the insulation 53 upon the other side, thereby breaking the circuit until the speed decreases sufficiently to restore the said spring 52 back upon the contact portion 54.

Referring now to the diagram shown in Fig. 2, the field-magnet circuit may be traced as follows: from the pendulum switch-lever 23 and pivot-pin 26ª to the sleeve 49 by wire 61, binding-post 58, wire 57, and brush 55, then by contact-spring 52, conducting portion 54, sleeve 47, brush 56, wire 57, binding-post 59, and wire 62 to the solenoid-switch 63, at which point the field-magnet coils respectively terminate in a series of independent contact-plates 64 64, arranged in the same vertical plane and designed to be gradually brought into mutual contact by means of said solenoid-switch 63, the construction of which will be fully described hereinafter.

65 designates a cable carrying the independent circuit-wires 66 66, which connect the terminal plates 64 64 with the independent field-magnet coils through the binding-posts 67 67.

Premising that the train is running on a downgrade or upon a level portion of the line, the field-magnet circuit will be closed by the gravity-switch. However, the same would not be complete until a certain speed sufficient to cause the contact-spring 52 of the speed-governor to engage the conducting portion 54 of the sleeve 47 had been developed by the train.

Although the speed-governor hereinbefore described is designed to prevent the dynamo from generating current except within certain limits of speed, no means has yet been described whereby the electro-motive force of the current generated by the said dynamo can be rendered uniform and the charging-current supplied to the battery made constant. The device for accomplishing this end is a solenoid-switch 63, above referred to. It consists of a vertically-movable core 68, attached at its upper extremity to the retractile spring 69 and extending downwardly through a suitable aperture into the interior of the coil 70, which latter is included in a shunt-circuit 71 72, connected in parallel with the charging-circuit leading to the storage-battery 12. The terminal spring-contacts 64 64, which are severally in circuit with the independent field-coils of the dynamo 1, are arranged in the same vertical line with the core 68, so that the latter will by its upward movement be capable of bringing all of said terminal plates 64 64 serially in contact with each other. Thus should the core move upwardly by virtue of the tension of the spring 69 the terminal plate 73 of the conductor 62 will be brought into contact with the next adjacent plate 64, which in turn will be forced against the next, and so on until all are respectively in contact, thereby gradually cutting in two or more of the field-coils in multiple arc.

It will be obvious that as long as the battery contains no charge or contains a charge below its capacity all of the field-coils of the dynamo will be in circuit, since the spring 69 is free to exert its tension upon the core 68; but should the battery receive a charge which would develop a counter electro-motive force greater than the direct electro-motive force of the charging-current a portion of the said charging-current will be diverted through the shunt 71 72, instead of being forced back into the generator, for the reason that the resistance 74 in this branch 71 72 is less than the resistance of the charging-circuit from the dynamo. Therefore the current diverted into this branch will energize the coil 70 proportionally to the amount diverted, causing the core 68 to be downwardly attracted, thus separating the contact-plates 64 64 and cutting out more or less of the field-coils of the generator, according to the attractive force of the coil. By means of this solenoid-switch more or less of the field-coils are cut in or out, according to the state of charge in the battery. Consequently the electro-motive force of the charging-current is kept practically constant by this automatic regulation.

An exterior exciting source may be introduced into the field-magnet circuit if desirable, as shown diagrammatically at 75 in Fig. 2.

The supply-circuit 76 77, extending from the battery, feeds into two branches 78 79, the former including incandescent lamps and the latter an alternating commutator 80, designed to render a continuous current from the battery alternating or intermittent.

81 designates the heating-circuit, including low-resistance heat-radiating devices of any approved construction, and is connected in multiple arc with the terminals of the secondary circuit of the inductional transformer 82, whose primary coils are in circuit with the alternating commutator 80 by the conductors 83 and 84.

As shown in Fig. 1 of the drawings, the secondary or storage battery 12 is preferably placed underneath the center of the coach in a suitable compartment or boxing having hinged doors, whereby ready access may be had to the interior. In this view the low-tension heat-radiating devices are conventionally shown in dotted lines connected in multiple arc with the supply-circuit from the secondary battery.

It will be obvious that each car or coach may be provided with its own generator and auxiliary equipments. However, in practice I consider it preferable to equip one of the forward cars of the train with my invention and to extend the supply-circuit from the secondary battery throughout the several rear cars containing the heat-radiating devices and the electric lights.

Figure 9:
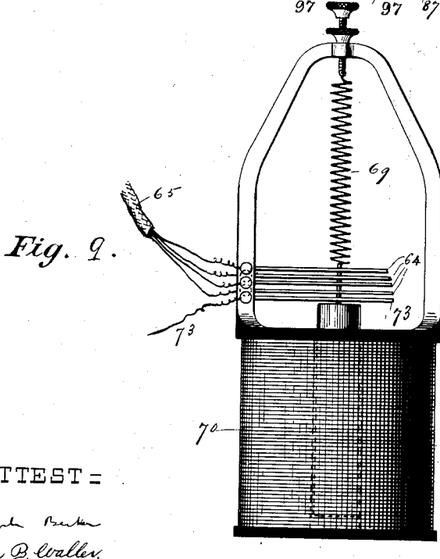
Figs. 9 and 10 are detail views of the field-magnet solenoid-switch shown in diagram in Fig. 2.
Figure 10:
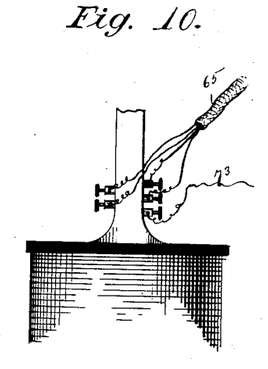

In order to preserve the continuity of the circuit between the cars of the train, it would be essential to provide an automatic electrical coupling device between the adjacent cars, and accordingly I have shown in Fig. 9 of the drawings a coupling so arranged and constructed as to fulfill this purpose. It consists, essentially, of two draw-heads 85 and 86, provided with suitable longitudinally-extending perforations to permit the introduction of the outgoing and return conductors of the supply-circuit. Each draw-head 85 86 is circular in form, and is provided on one side of a diametrical line with a circular recess 87, conforming in shape and dimension with a conducting-plug 88, carried by the opposite draw-head and designed to enter and fit into said recess. On the interior circular walls of said recess are provided two curved contact-springs 89 and 90, which are so shaped and situated as to correspond to the contour of its respective plug 88 and to embrace and clamp the neck of the same when it is inserted between the said springs. On the other side of said diametrical line is firmly secured one extremity of a plug 88, the free end of which projects exteriorly a distance approximately equal to the depth of its corresponding recess 87 in the adjacent draw-head. Each plug 88 is longitudinally divided by a strip of insulation into two portions, one of which is of conducting metal and the other is insulating material. Near the forward free extremity of each plug is formed a curved recess or neck 91, conforming in shape to the contour of its respective springs 89 and 90. Thus when the two draw-heads 85 86 are properly brought together in accordance with the position shown in Fig. 9 the plug of one will enter into the recess of the other, being therein retained by the tension of the springs 89 and 90. Owing to the tapering ends of these plugs, they will, when inserted into their respective recesses, force the springs 89 and 90 apart to permit entrance, the latter being guided along the surface thereof until they slide down and fit into the neck 91 of each plug. The draw-head is preferably made of insulating material, and is provided at its rear extremity with a circular rib or flange, over which may be secured a flexible tubing 95 by the clamping-ring 96.

The electrical connections are as follows: 92 designates the outgoing conductor and is electrically in circuit with the spring 89 of the draw-head 86. 93 is the return-conductor, electrically connected with the conducting portion of the plug 88 of the same draw-head, and 94 is a shunt or branch connecting the return-conductor with the other contact-spring 90. The electrical connections of the draw-head 85 are inversely arranged with reference to those just described—that is to say, the shunt or branch 94 in this case connects the spring 90 with the outgoing conductor 92.

The operation of this coupling may be briefly described as follows: Presuming that the draw-heads 85 and 86 are brought together and that the respective plugs and springs are in proper position, the circuit will be along conductor 92, spring 89, plug 88, on throughout the train and back by conductor 93, spring 89, plug 88, &c., the circuit being followed in the direction of the arrow indicated in Fig. 9. In tracing the beforementioned circuits the supposition was that the coupling here represented was located between two coaches, neither of which was disconnected from the other portion of the train. However, if the coach to which either of the draw-heads 85 or 86 is attached were disconnected from its next adjacent coach it will be obvious that the circuit in that case would be from along conductor 92, spring 89, plug 88, conductor 92, to the other end of the car, passing through the disconnected draw-head there corresponding in its construction to the draw-head 86, over spring 89, to spring 90, and by branch 94 back to the return-conductor 93. Thus it will be understood that even on the last car of the train the circuit will be looped by the springs 89 and 90 and the branch 94. The arrangement of the respective couplings at the end of each coach is so made as to cause their proper engagement automatically, similar to the air-brake, as shown more clearly in Fig. 1.

While I have shown and described in this case a vertically-pivoted or pendulum lever controlling the circuit of the field-magnet of the dynamo-electric generator mounted upon a traveling vehicle, I make no claim to such devices in this case, reserving the same for another pending application—No. 205,941—filed by me June 22, 1886.

Having thus fully and accurately described my invention, what I claim, and desire to secure by Letters Patent, is—

1. The combination, with a dynamo-electric generator mounted upon a traveling vehicle and having its armature mechanically connected with an axle of said vehicle, of a double set of commutator-brushes for said dynamo, a system of levers controlling the movement of both sets of brushes and operated by the direction of travel of the vehicle, pivoted contacts controlled by said system of levers, a vertically-pivoted circuit-controlling weighted lever arranged to engage one of said contacts and controlled by gravity, and the field-magnet circuit of said dynamo, including said gravity-lever and its contact.

2. The combination, with a dynamo-electric generator having its armature mounted upon the axle of a traveling vehicle, of a speed-governor mounted upon and controlled by said axle, and the field-magnet circuit of said dynamo controlled by said speed-governor.

3. The combination, with a dynamo-electric generator having independent field-coils and operated by the momentum of the train, of a secondary battery in circuit with said dynamo, and an electro-magnetic device for cutting in or out the field-coils of said dynamo controlled by a shunt or branch circuit from the secondary battery.

4. The combination, with a dynamo-electric generator, of a secondary battery in circuit with said generator, and an electro-magnetic device controlling the field-magnet circuit of said generator and included in a shunt-circuit from the secondary battery.

5. The combination, with a dynamo-electric generator having independent field-coils, of an electro-magnetic device for connecting said field-coils in multiple arc, a secondary battery controlling said electro-magnetic device and supplied with current from the said dynamo, and translating devices fed by said secondary battery.

6. The combination, with a dynamo-electric generator, of a secondary battery in circuit with said generator, a potential switch placed intermediately of the circuit leading from the dynamo to the battery and comprising a solenoid having two coils of equal resistance, and a movable core carrying contacts severally controlled by both coils of the solenoid and by a retractile spring, and a branch from the main circuit for each coil of the solenoid, one of said branches being of higher resistance than the other.

In testimony whereof I affix my signature in presence of two witnesses.

ELIAS E. RIES.

Witnesses:
F. R. HARDING,
CHARLES W. HANDY.